US010236950B2

(12) United States Patent
Wentink

(10) Patent No.: US 10,236,950 B2
(45) Date of Patent: Mar. 19, 2019

(54) VIDEO TRANSMISSION OVER SDMA

(75) Inventor: Maarten Menzo Wentink, Naarden (NL)

(73) Assignee: QUALCOMM Incorporated, San Diego, CA (US)

( * ) Notice: Subject to any disclaimer, the term of this patent is extended or adjusted under 35 U.S.C. 154(b) by 522 days.

(21) Appl. No.: 12/711,725

(22) Filed: Feb. 24, 2010

(65) Prior Publication Data
US 2010/0220654 A1 Sep. 2, 2010

Related U.S. Application Data

(60) Provisional application No. 61/156,402, filed on Feb. 27, 2009.

(51) Int. Cl.
*H04B 7/0417* (2017.01)
*H04L 1/16* (2006.01)
*H04L 1/18* (2006.01)
*H04W 72/12* (2009.01)

(52) U.S. Cl.
CPC ......... *H04B 7/0417* (2013.01); *H04L 1/1685* (2013.01); *H04L 1/1854* (2013.01); *H04W 72/1289* (2013.01)

(58) Field of Classification Search
CPC .................................................. H04B 7/0417
See application file for complete search history.

(56) References Cited

U.S. PATENT DOCUMENTS

| | | | | |
|---|---|---|---|---|
| 2002/0150102 A1* | 10/2002 | Janko et al. | ........... | 370/392 |
| 2003/0048765 A1* | 3/2003 | Jang | ............... | H04L 1/1642 370/337 |
| 2005/0129101 A1* | 6/2005 | Stephens | ............... | H04L 1/16 375/222 |
| 2005/0147023 A1* | 7/2005 | Stephens | ............ | H04B 7/0408 370/203 |
| 2005/0285719 A1* | 12/2005 | Stephens | ............... | 340/10.2 |
| 2007/0153714 A1 | 7/2007 | Shapira et al. | | |
| 2007/0153754 A1* | 7/2007 | Shapira | ............... | H04W 16/10 370/338 |
| 2008/0176591 A1 | 7/2008 | Fujimoto | | |
| 2008/0310363 A1* | 12/2008 | McBeath et al. | ............ | 370/330 |
| 2009/0046604 A1 | 2/2009 | Matsumoto et al. | | |
| 2009/0094498 A1* | 4/2009 | Kim | ............... | H04L 1/1614 714/750 |

(Continued)

FOREIGN PATENT DOCUMENTS

JP H04355533 A 12/1992
JP H05136719 A 6/1993

(Continued)

OTHER PUBLICATIONS

"Computer Communications, vol. 31, issue 14 Joint uplink/downlink opportunistic scheduling for Wi-Fi WLANs," Sep. 5, 2008, hereinafter, Yoo et al.*

(Continued)

*Primary Examiner* — Jason E Mattis
(74) *Attorney, Agent, or Firm* — Patterson & Sheridan, LLP

(57) ABSTRACT

Certain aspects of the present disclosure generally relate to communication, and more specifically, to techniques for transmitting data in parallel, such as spatial division multiple access (SDMA) techniques.

40 Claims, 15 Drawing Sheets

(56) References Cited

U.S. PATENT DOCUMENTS

2011/0058529 A1    3/2011  Uemura
2011/0096723 A1    4/2011  Aoyama et al.
2011/0182245 A1*   7/2011  Malkamaki et al. ......... 370/329

FOREIGN PATENT DOCUMENTS

| | | |
|---|---|---|
| JP | 2006246539 A | 9/2006 |
| JP | 2007517474 A | 6/2007 |
| JP | 2008131599 A | 6/2008 |
| JP | 2008160742 A | 7/2008 |
| TW | I236250 B | 7/2005 |
| TW | I248739 B | 2/2006 |
| TW | 200611525 | 4/2006 |
| TW | I264942 B | 10/2006 |
| TW | I271079 B | 1/2007 |
| WO | WO-2006075586 A1 | 7/2006 |
| WO | WO2007074452 | 7/2007 |
| WO | WO-2009020109 A1 | 2/2009 |
| WO | WO-2009022472 A1 | 2/2009 |

OTHER PUBLICATIONS

International Search Report and Written Opinion—PCT/US2010/025664, International Search Authority—European Patent Office—dated Mar. 2, 2011.
Taiwan Search Report—TW099105881—TIPO—dated Feb. 19, 2013.

* cited by examiner

| QC bit 5 | QC bit 6 | Meaning |
|---|---|---|
| 0 | 0 | Normal ACK or Implicit BAR.<br><br>In an MPDU that is a non-A-MPDU frame: The addressed recipient returns an ACK or QoS +CF-Ack frame after a short interframe space (SIFS) period. For QoS Null (no data) frames, this is the only permissible value for the Ack Policy subfield.<br><br>In an MPDU that is part of an A-MPDU: The addressed recipient returns a BA MPDU, either individually or as part of an A-MPDU starting a SIFS after the PPDU carrying the frame. |
| 1 | 0 | No Ack:<br><br>The addressed recipient takes no action upon receipt of the frame.<br><br>The Ack Policy subfield is set to this value in all directed frames in which the sender does not require acknowledgement. This combination is also used for group addressed frames that use the QoS frame format. This combination is not used for QoS data frames with a TID for which a Block Ack agreement exists. |
| 0 | 1 | No explicit acknowledgement, or PSMP Ack.<br><br>When bit 6 of the frame control field is set to 1:<br>There may be a response frame to the frame that is received, but it is neither the ACK nor any data frame of subtype +CF-Ack.<br><br>For QoS CF-Poll and QoS CF-Ack+CF-Poll data frames, this is the only permissible value for the Ack Policy subfield.<br><br>When bit 6 of the frame control field is set to 0:<br>The acknowledgement for a frame indicating PSMP Ack when it appears in a PSMP-DTT is to be received in a later PSMP-UTT. The acknowledgement for a frame indicating PSMP Ack when it appears in a PSMP-UTT is to be received in a later PSMP-DTT.<br><br>Note—Bit 6 of the frame control field indicates the absence of a data payload. When set to 1, the QoS data frame contains no payload, and any response is generated in response to a QoS CF-Poll or QoS CF-Ack+CF-Poll frame, but does not signify an acknowledgement of data. When set to 0, the QoS data frame contains a payload, which is acknowledged as described in PSMP Acknowledgement rules. |
| 1 | 1 | Block Ack<br><br>The addressed recipient takes no action upon the receipt of the frame except for recording the state. The recipient can expect a BlockAckReq frame in the future to which it responds with a BlockAck. |

FIG. 4

| Value | Meaning |
|---|---|
| 0 | Normal acknowledgment. The BAR Ack Policy field is set to this value when the sender requires immediate acknowledgment. The addressee returns an ACK.<br><br>See 9.16.1.7. |
| 1 | No Acknowledgment<br>The addressee sends no immediate response upon receipt of the frame.<br>The BAR Ack Policy is set to this value when the sender does not require immediate acknowledgment. |

FIG. 5

VIDEO TRANSMISSION OVER SDMA

CLAIM OF PRIORITY UNDER 35 U.S.C. § 119

The present application for patent claims benefit of U.S. Provisional Patent Application No. 61/156,402, entitled, "VIDEO TRANSMISSION OVER SDMA," filed Feb. 27, 2009 assigned to the assignee hereof and hereby expressly incorporated by reference herein.

TECHNICAL FIELD

The present disclosure generally relates to communication and more specifically to spatial division multiple access (SDMA) systems.

BACKGROUND

In order to address the issue of increasing bandwidth requirements demanded for wireless communication systems, different schemes are being developed to allow multiple user terminals to communicate with a single base station by sharing the same channel (same time and frequency resources) while achieving high data throughputs. Spatial Division Multiple Access (SDMA) represents one such approach that has recently emerged as a popular technique for the next generation communication systems.

In SDMA systems, a base station may transmit or receive different signals to or from a plurality of mobile user terminals at the same time and using the same frequency. In order to achieve reliable data communication, user terminals may need to be located in sufficiently different directions. Independent signals may be simultaneously transmitted from each of multiple space-separated antennas at the base station. Consequently, the combined transmissions may be directional, i.e., the signal that is dedicated for each user terminal may be relatively strong in the direction of that particular user terminal and sufficiently weak in directions of other user terminals. Similarly, the base station may simultaneously receive on the same frequency the combined signals from multiple user terminals through each of multiple antennas separated in space, and the combined received signals from the multiple antennas may be split into independent signals transmitted from each user terminal by applying the appropriate signal processing technique.

A multiple-input multiple-output (MIMO) wireless system employs a number ($N_T$) of transmit antennas and a number ($N_R$) of receive antennas for data transmission. A MIMO channel formed by the $N_T$ transmit and $N_R$ receive antennas may be decomposed into $N_S$ spatial streams, where, for all practical purposes, $N_S$ min $\{N_T, N_R\}$. The $N_S$ spatial streams may be used to transmit $N_S$ independent data streams to achieve greater overall throughput.

In a multiple-access MIMO system based on SDMA, an access point can communicate with one or more user terminals at any given moment. If the access point communicates with a single user terminal, then the $N_T$ transmit antennas are associated with one transmitting entity (either the access point or the user terminal), and the $N_R$ receive antennas are associated with one receiving entity (either the user terminal or the access point). The access point can also communicate with multiple user terminals simultaneously via SDMA. For SDMA, the access point utilizes multiple antennas for data transmission and reception, and each of the user terminals typically utilizes less than the number of access point antennas for data transmission and reception. When SDMA is transmitted from an access point, $N_S=\min\{N_T, \text{sum}(N_R)\}$, where $\text{sum}(N_R)$ represents the summation of all user terminal receive antennas. When SDMA is transmitted to an access point, $N_S=\min\{\text{sum}(N_T), N_R\}$, where $\text{sum}(N_T)$ represents the summation of all user terminal transmit antennas.

SUMMARY

Certain aspects provide a method for transmitting data to multiple wireless apparatuses. The method generally includes transmitting, to the wireless apparatuses, a transmission comprising data frames for each wireless apparatus during a first transmit opportunity and receiving, during one or more second transmit opportunities, acknowledgements of receipt of the data frames from the wireless apparatuses. For certain aspects, the first transmit opportunity may comprise a downlink transmit opportunity, and the second transmit opportunities may comprise uplink transmit opportunities.

Certain aspects provide a method of wireless communications. The method generally includes receiving a transmission comprising a data frame during a first transmit opportunity in which multiple data frames were sent to multiple wireless apparatuses and transmitting an acknowledgement of receipt of the data frame during a second transmit opportunity. For certain aspects, the first transmit opportunity may comprise a downlink transmit opportunity, and the second transmit opportunity may comprise an uplink transmit opportunity.

Certain aspects provide an apparatus for transmitting data to multiple wireless apparatuses. The apparatus generally includes a transmitter for transmitting, to the wireless apparatuses, a transmission comprising data frames during a first transmit opportunity and a receiver for receiving, during one or more second transmit opportunities, acknowledgements of receipt of the data frames from the wireless apparatuses.

Certain aspects provide an apparatus for wireless communications. The apparatus generally includes a receiver for receiving a transmission comprising a data frame during a first transmit opportunity in which multiple data frames were sent to multiple wireless apparatuses and a transmitter for transmitting an acknowledgement of receipt of the data frame during a second transmit opportunity.

Certain aspects provide an apparatus for transmitting data to multiple wireless apparatuses. The apparatus generally includes means for transmitting, to the wireless apparatuses, a transmission comprising data frames during a first transmit opportunity and means for receiving, during one or more second transmit opportunities, acknowledgements of receipt of the data frames from the wireless apparatuses.

Certain aspects provide an apparatus for wireless communications. The apparatus generally includes means for receiving a transmission comprising a data frame during a first transmit opportunity in which multiple data frames were sent to multiple wireless apparatuses and means for transmitting an acknowledgement of the received data frame during a second transmit opportunity.

Certain aspects provide a computer-program product for communication, comprising a computer readable medium comprising instructions. The instructions are generally executable to transmit, to multiple wireless apparatuses, a transmission comprising data frames during a first transmit opportunity and receive, during one or more second transmit opportunities, acknowledgements of the data frames from the wireless apparatuses.

Certain aspects provide a computer-program product for communication, comprising a computer readable medium comprising instructions. The instructions are generally executable to receive a transmission comprising a data frame during a first transmit opportunity in which multiple data frames were sent to multiple wireless apparatuses and transmit an acknowledgement of the received data frame during a second transmit opportunity.

Certain aspects provide a wireless access point. The access point generally includes at least one antenna, a transmitter for transmitting via the antenna, to multiple wireless apparatuses, a transmission comprising data frames during a first transmit opportunity, and a receiver for receiving via the antenna, during one or more second transmit opportunities, acknowledgements of receipt of the data frames from the wireless apparatuses.

Certain aspects provide a wireless station. The wireless station generally includes at least one antenna, a receiver for receiving via the antenna a transmission comprising a data frame during a first transmit opportunity in which multiple data frames were sent to multiple wireless apparatuses, and a transmitter for transmitting via the antenna an acknowledgement of receipt of the data frame during a second transmit opportunity.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 4 illustrates example acknowledgement (ACK) policies for data frames, in accordance with certain aspects of the present disclosure.

FIG. 5 illustrates acknowledgement (ACK) policies for Block ACK Request (BAR) frames, in accordance with certain aspects of the present disclosure.

DETAILED DESCRIPTION

Certain aspects of the present disclosure provide techniques and apparatus that may be utilized to transmit data, such as video data, in Spatial-Division Multiple Access (SDMA) systems.

An Example Wireless Communication System

Various aspects of certain aspects of the present disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

The word "exemplary" is used herein to mean "serving as an example, instance, or illustration." Any aspect described herein as "exemplary" is not necessarily to be construed as preferred or advantageous over other aspects.

The multi-antenna transmission techniques described herein may be used in combination with various wireless technologies such as Code Division Multiple Access (CDMA), Orthogonal Frequency Division Multiplexing (OFDM), Time Division Multiple Access (TDMA), and so on. Multiple user terminals can concurrently transmit/receive data via different (1) orthogonal code channels for CDMA, (2) time slots for TDMA, or (3) subbands for OFDM. A CDMA system may implement IS-2000, IS-95, IS-856, Wideband-CDMA (W-CDMA) or some other standards. An OFDM system may implement IEEE 802.11 or some other standards. A TDMA system may implement GSM or some other standards. These various standards are known in the art.

Figure 1:
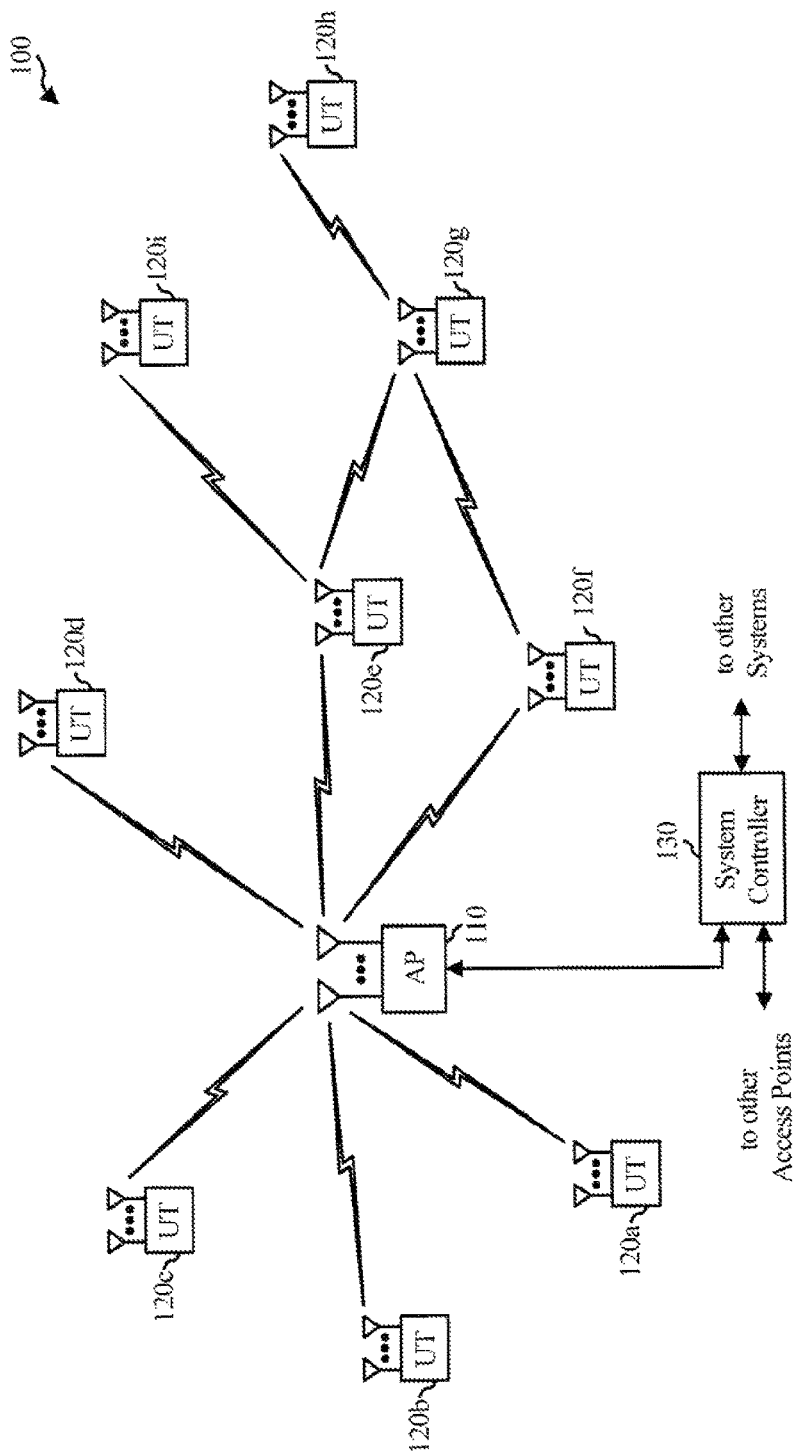
FIG. 1 illustrates a spatial division multiple access multiple-input/multiple-output (MIMO) wireless system in accordance with certain aspects of the present disclosure.

FIG. 1 shows a multiple-access MIMO system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device, simply a "station" or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via SDMA, for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

System 100 employs multiple transmit and multiple receive antennas for data transmission on the downlink and uplink. Access point 110 is equipped with $N_{ap}$ antennas and represents the multiple-input (MI) for downlink transmissions and the multiple-output (MO) for uplink transmissions. A set of $N_u$ selected user terminals 120 collectively represents the multiple-output for downlink transmissions and the multiple-input for uplink transmissions. For pure SDMA, it is desired to have $N_{ap} \geq N_u \geq 1$ if the data symbol streams for the $N_u$ user terminals are not multiplexed in code, frequency or time by some means. $N_u$ may be greater than $N_{ap}$ if the data symbol streams can be multiplexed using different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The $N_u$ selected user terminals can have the same or a different number of antennas.

The SDMA system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported).

Figure 2:
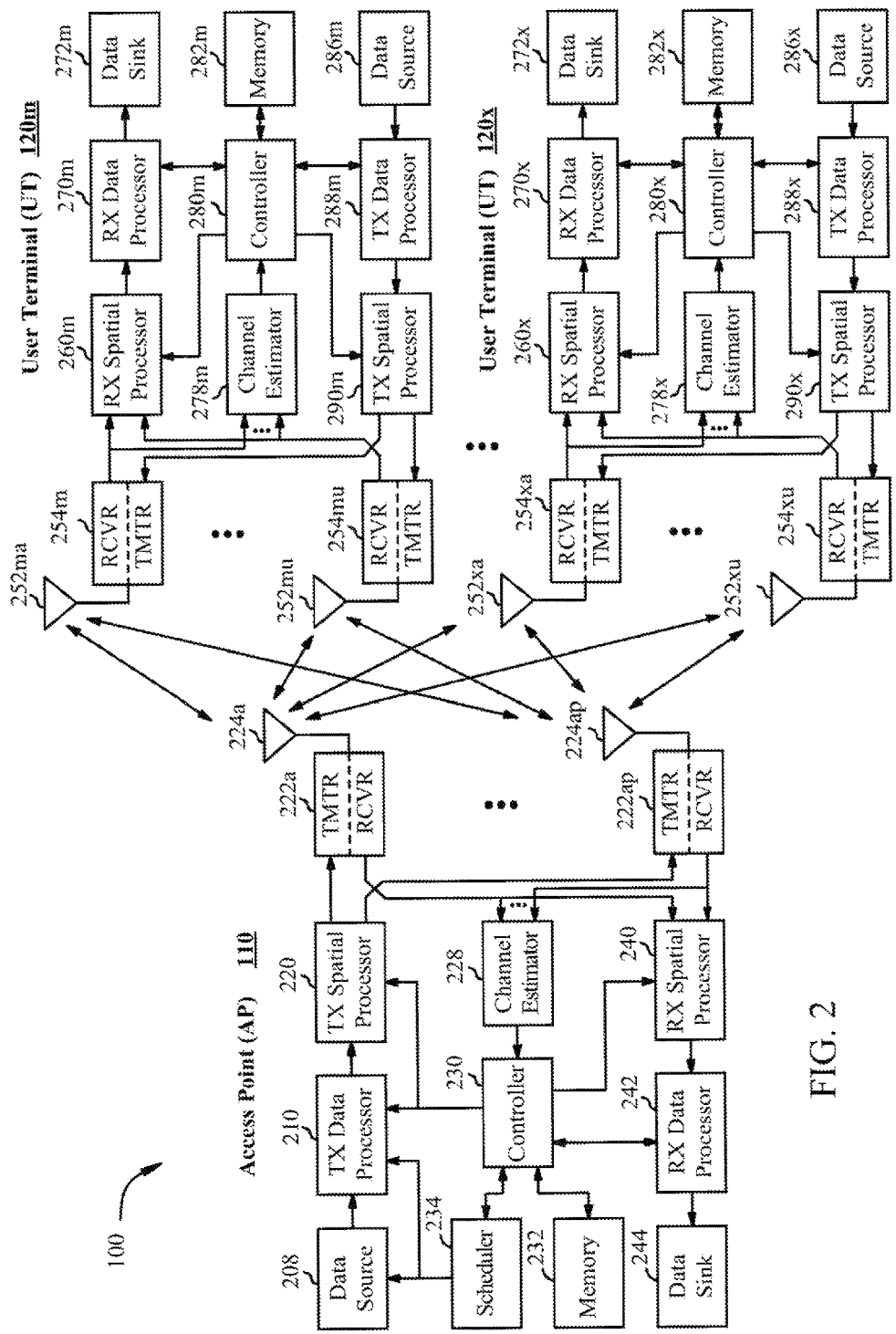
FIG. 2 illustrates a block diagram of an access point and two user terminals in accordance with certain aspects of the present disclosure.

FIG. 2 shows a block diagram of access point 110 and two user terminals 120m and 120x in MIMO system 100. Access point 110 is equipped with antennas 224a through 224t. User terminal 120m is equipped with antennas 252ma through 252mu, and user terminal 120x is equipped with antennas 252xa through 252xu. Access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink (i.e., $N_{up}$ user terminals may transmit to the AP simultaneously on the uplink via SDMA), $N_{dn}$ user terminals are selected for simultaneous transmission on the downlink (i.e., the AP may transmit to $N_{dn}$ user terminals simultaneously on the downlink via SDMA), $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides transmit symbol streams for the antennas. Each transmitter unit (TMTR) 254 receives and processes (e.g., converts to analog, amplifies, filters, and frequency upconverts) a respective transmit symbol stream to generate an uplink signal. transmitter units 254 provide uplink signals for transmission from antennas 252 to the access point.

$N_{up}$ user terminals may be scheduled for simultaneous transmission on the uplink. Each of these user terminals performs spatial processing on its data symbol stream and transmits its set of transmit symbol streams on the uplink to the access point.

At access point 110, antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the received symbol streams from receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing (such as a precoding or beamforming, as described in the present disclosure) on the $N_{dn}$ downlink data symbol streams, and provides transmit symbol streams for the antennas. Each transmitter unit 222 receives and processes a respective transmit symbol stream to generate a downlink signal, transmitter units 222 providing downlink signals for transmission from antennas 224 to the user terminals.

At each user terminal 120, antennas 252 receive the downlink signals from access point 110. Each receiver unit 254 processes a received signal from an associated antenna 252 and provides a received symbol stream. An RX spatial processor 260 performs receiver spatial processing on received symbol streams from receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal, where the subscript m refers to the "$m^{th}$" user terminal. Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates and so on) to the access point. Controllers 230 and 280 also control the operation of various processing units at access point 110 and user terminal 120, respectively.

Figure 3:
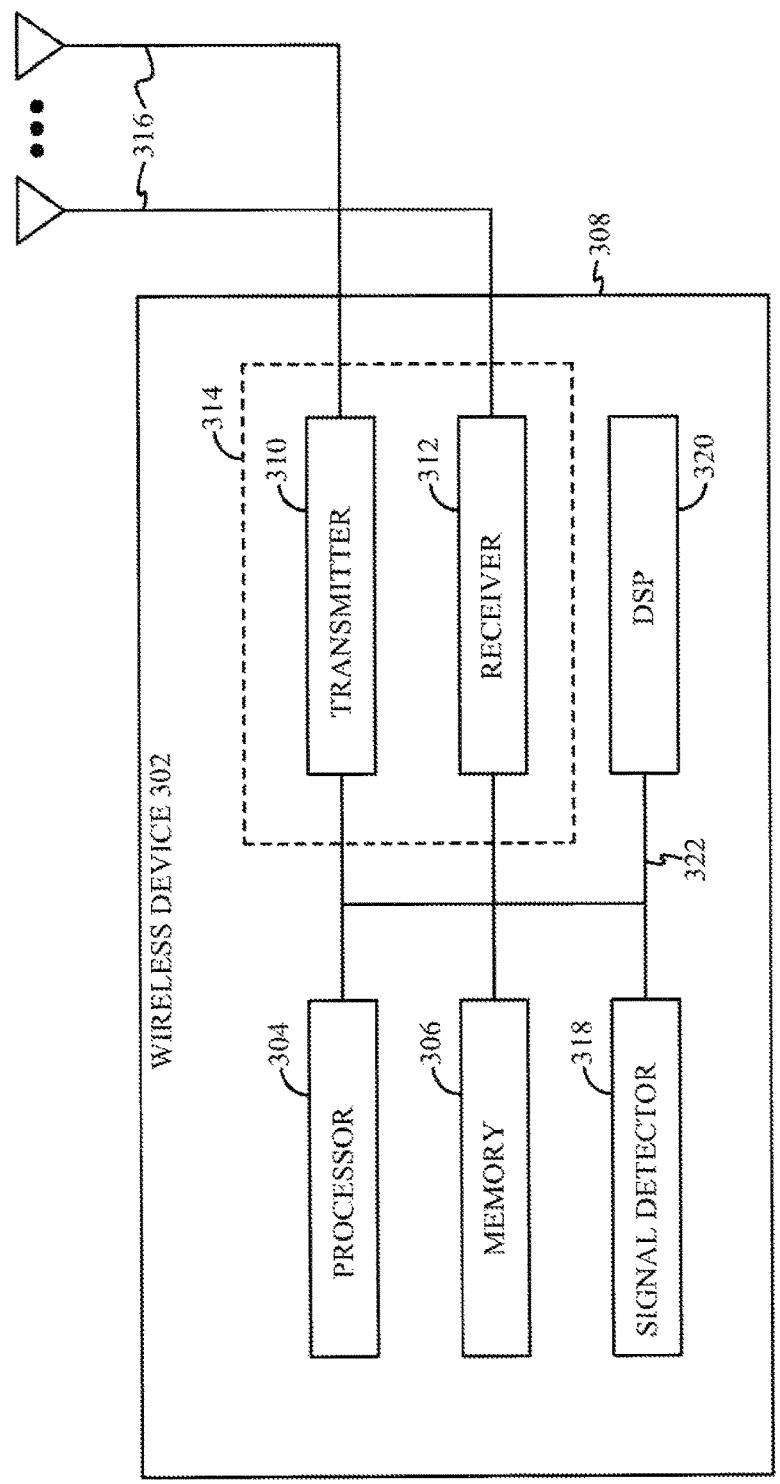
FIG. 3 illustrates various components that may be utilized in a wireless device in accordance with certain aspects of the present disclosure.

FIG. 3 illustrates various components that may be utilized in a wireless device 302 that may be employed within the wireless communication system 100. The wireless device 302 is an example of a device that may be configured to implement the various methods described herein. The wireless device 302 may be any type of wireless node, such as an access point (AP) or station (user terminal).

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

As used herein, the term "legacy" generally refers to wireless network nodes that support 802.11n or earlier versions of the 802.11 standard.

While certain techniques are described herein with reference to SDMA, those skilled in the art will recognize the techniques may be generally applied in systems utilizing any type of multiple access schemes, such as SDMA, OFDMA, CDMA, and combinations thereof.

The wireless system shown in FIGS. 1-3 may be implemented as an SDMA system where antennas at the access point are located in sufficiently different directions, which insures no interference between simultaneously transmitted spatial streams dedicated to different user terminals. For certain aspects of the present disclosure, the wireless system shown in FIGS. 1-3 may refer to the multiuser system where a precoding (beamforming) of the transmission signal is applied providing orthogonality between spatial streams dedicated to different user terminals, while the access point antennas do not necessarily need to be located in sufficiently different directions.

In a Spatial Division Multiple Access (SDMA) scheme, uplink (UL) transmissions from multiple stations (STA) to an access point (AP) should be synchronized. UL transmissions should be synchronized in terms of arrival time at the AP, frequency, received power length of packets, and allocation of spatial streams.

The wireless system shown in FIGS. 1-3 may refer to the SDMA system where antennas at the access point are located in sufficiently different directions, which insures no interference between simultaneously transmitted spatial streams dedicated to different user terminals. For certain aspects of the present disclosure, the wireless system shown in FIGS. 1-3 may refer to the multiuser system where a precoding (beamforming) of the transmission signal is applied providing orthogonality between spatial streams dedicated to different user terminals, while the access point antennas do not necessarily need to be located in sufficiently different directions.

An Access Point (AP) may start uplink SDMA transmissions by sending a Demarcation Indication (DI) frame. The DI frame specifies if and how a station (STA) may transmit during the pending uplink SDMA TXOP. The uplink SDMA TXOP starts at a fixed time interval after the DI frame. Resources inside an SDMA TXOP may be requested by sending an Allocation Indication (AI) frame. The AP may acknowledge an AI by sending an Allocation Response (AR) frame.

High Throughput (HT)-immediate Block ACK (BA) generally refers to a form of Block ACK in which the BA frame is transmitted a Short Interframe Space (SIFS) after the end of the received Physical Layer Protocol Data Unit (PPDU) containing a Block ACK Request (BAR) or an implicit BAR. HT-immediate BA is further defined in 802.11n.

HT-delayed BA generally refers to a form of Block ACK in which the BA frame is transmitted in the next Transmit Opportunity (TXOP) after the receipt of the PPDU containing a BAR. HT-delayed BA is further defined in 802.11n.

Power Save Multi-Poll (PSMP) generally refers to a channel access method which is described in 802.11n. PSMP starts with a PSMP frame transmitted by the AP, which specifies for each addressed station a Downlink Transmission Time (DTT) and an Uplink Transmission Time (UTT), respectively. The ACK policy on data frames transmitted using PSMP is PSMP Ack, which is a form of HT-immediate BA, but with the additional requirement that the BA is not transmitted SIFS after the end of the PPDU reception, but during a scheduled uplink or downlink time slot. PSMP is further defined in 802.11n.

FIG. 4 illustrates example ACK policies on Data frames. As illustrated, possible policies include a Normal Ack or Implicit BA Request, No Ack, No explicit Ack or PSMP Ack, or Block Ack. FIG. 5 illustrates example ACK policies on BAR frames, based on 802.11n. As illustrated, recipients may be required to return an ACK (Normal Ack or Implicit BAR) or take no action (No Ack).

UDP Video Transmission Over SDMA

Certain aspects of the present disclosure provide techniques for scheduling parallel transmissions as an SDMA Transmit Opportunity (SDMA TXOP). It may be noted that this term may cover similar technologies as well. Such parallel transmissions may be utilized in various applications, for example, involving video streams.

Figure 6:
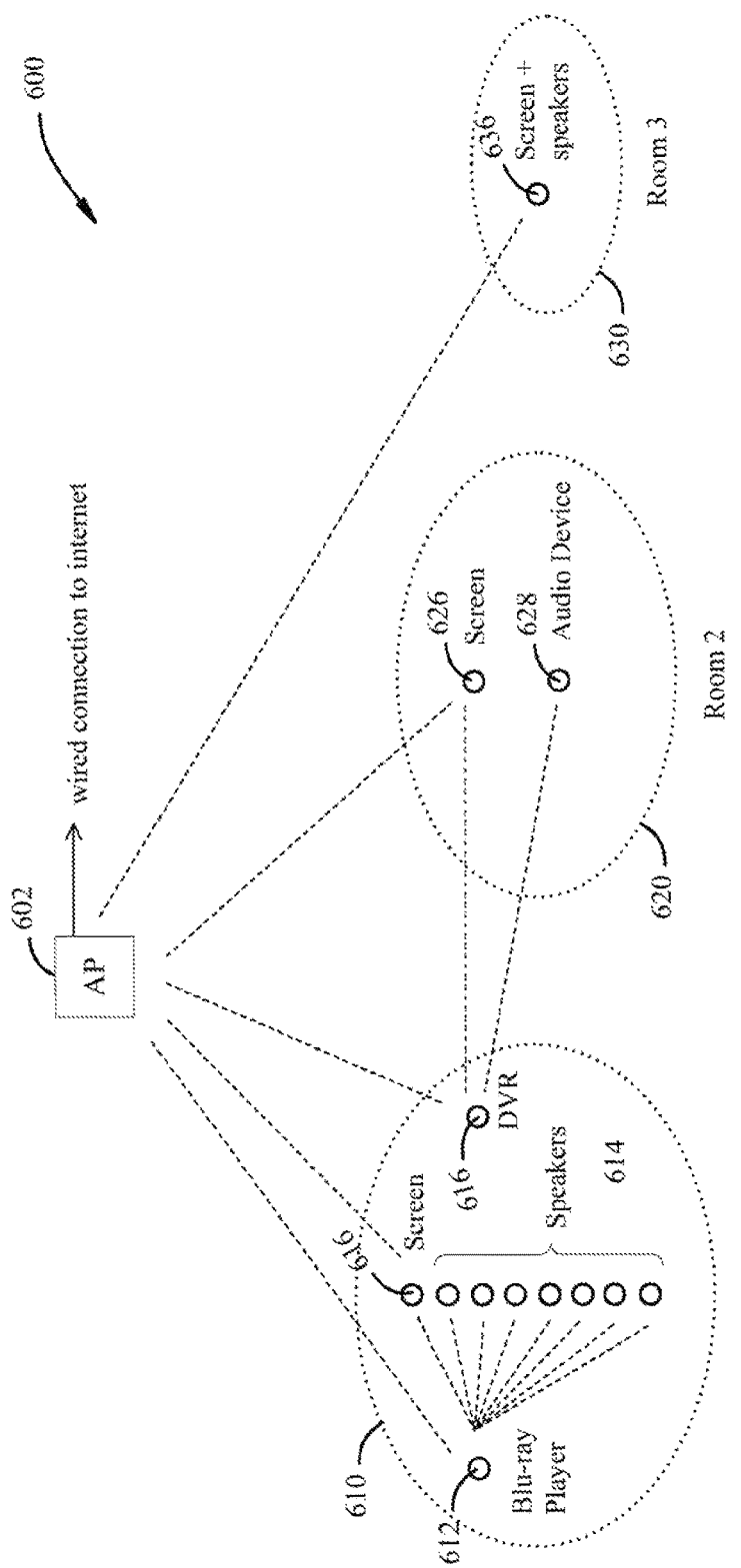
FIG. 6 illustrates an example environment in which aspects of the present disclosure may be utilized.

For example, in a home environment, audio-video (AV) traffic may be exchanged between several sources and destinations, as illustrated in FIG. 6. As illustrated in FIG. 6, an access point (AP) 602, illustratively shown with a wired connection to the Internet, may stream media to various devices, such as a Blu-ray player 612, monitor (screen) 616, and digital video recorder (DVR) 618 in a first room 610, a screen 626 and audio device 628 located in a second room 620, and a device 636 with integrated screen and speakers in a third room 630. The AP may, for example, comprise a cable modem, set-top box, router, or the like.

As illustrated, devices receiving streams from the AP may also stream to various other devices. For example, the player 612 may stream to the screen 616 and speakers 614, the DVR may stream to screen 626 and audio device 628. Thus, certain devices may be sources and receivers of streams.

When User Datagram Protocol (UDP) is used for downlink transmission of video streams, the only uplink traffic may be Media Access Control (MAC)-level acknowledgement messages. Because there may be relatively little or no uplink data flow, there may be no MAC level acknowledgements in the downlink direction.

Figure 7:
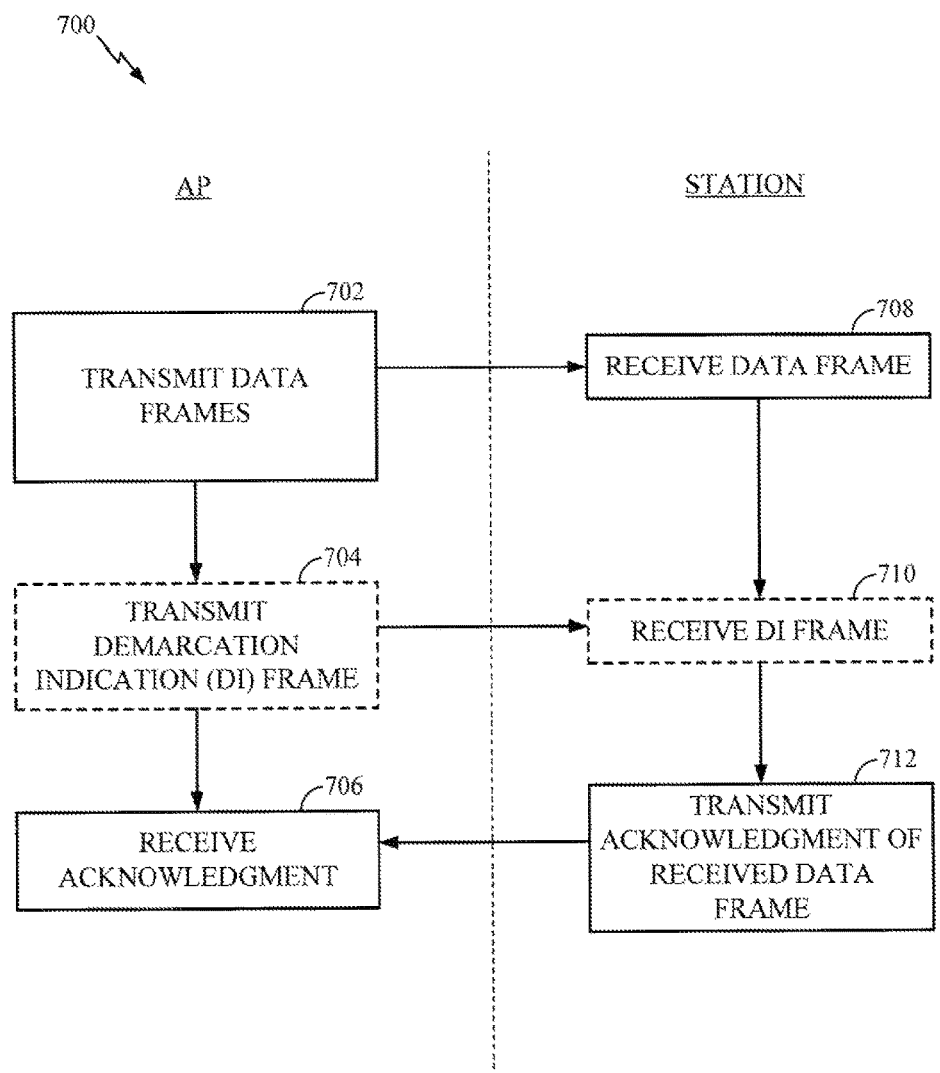
FIG. 7 illustrates example operations for transmitting data frames, in accordance with certain aspects of the present disclosure.

A UDP packet encapsulated as an 802.11 MPDU may be referred to as a UDP frame. Similarly, a Transmission Control Protocol (TCP) packet encapsulated as an 802.11 MPDU may be referred to as a TCP frame. FIG. 7 illustrates example operations 700 that may be performed by an AP and a station in a SDMA system for parallel data transmission (e.g., parallel UDP transmissions). Operations 702-706 may be performed, for example, by an AP such as the AP 602 in FIG. 6. Operations 708-712 may be performed, for example, by a station similar to the devices communicating with the AP 602 as illustrated in FIG. 6.

At 702, a transmission comprising one or more data frames (e.g., UDP frames transmitted as downlink data) may be transmitted to one or more stations during a first transmit opportunity (e.g., a downlink transmit opportunity). At 708, one of the data frames may be received at a station. The data carried by the data frames may be video data. According to certain aspects, the data frames may be transmitted via one or more Aggregated MAC Protocol Data Units (A-MPDUs). The data frames may also specify an acknowledge (ACK) policy. The ACK policy may contain information regarding how the received data frame is to be acknowledged by the stations.

At 704, a Demarcation Indication (DI) frame may be transmitted. At 710, the DI frame may be received by a station. The DI frame may be used to start an uplink SDMA TXOP. The DI frame may specify if and how a station (STA) may transmit during the pending uplink SDMA TXOP. The DI frame and data frames may be transmitted using various approaches as will be described later. For example, according to certain aspects, the DI frame and data frames may be transmitted together via the same downlink A-MPDU.

At 712, acknowledgement for the previously received data frame may be sent by the station, in accordance with the information in the received DI frame, at a second transmit opportunity (e.g., an uplink transmit opportunity). At 706, the acknowledgement may be received by the AP.

FIGS. 8-14 illustrate examples of parallel transmission of video streams. These examples illustrate parallel transmissions in accordance with the operations of FIG. 7. Components involved in these examples may correspond to the components of the system illustrated in FIG. 6.

Figure 8:
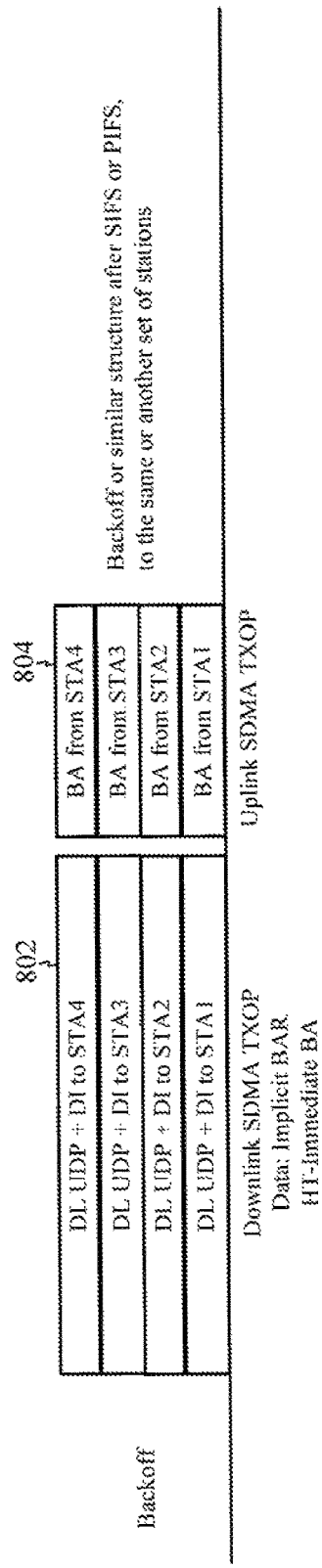
FIGS. 8-14 illustrate example frame exchanges, in accordance with certain aspects of the present disclosure.

According to FIG. 8, after a backoff period, the AP may start a downlink SDMA TXOP. During the downlink SDMA TXOP, the AP may transmit A-MPDUs 802 to stations 1-4 in parallel. As illustrated, the downlink A-MPDUs may contain one or more downlink UDP frames and a DI. The one or more UDP frames may contain video data.

According to certain aspects, the DI may indicate the timing and the resource allocation of a pending uplink SDMA TXOP. As illustrated, the one or more UDP frames may specify the Implicit Block ACK Request (BAR) policy. High Throughput (HT)-immediate BAs may be used to acknowledge the downlink UDP streams. During the uplink SDMA TXOP, the stations transmit the BA frames 804 to the AP to acknowledge receipt of the UDP frames, as effectively requested by the Implicit BAR on the downlink UDP frames.

As this example illustrates, the resource allocation in the uplink direction may differ from the resource allocation in the downlink direction. A similar frame exchange sequence may follow after a backoff, Short Inter-frame Space (SIFS) or Point Control Function Inter-frame Space (PIFS) interval, to the same or a different set of stations. The stations present in the uplink SDMA TXOP may be different than the stations addressed in the downlink SDMA TXOP, because the DI frames are sent as unicast rather than multicast or broadcast.

Figure 9:
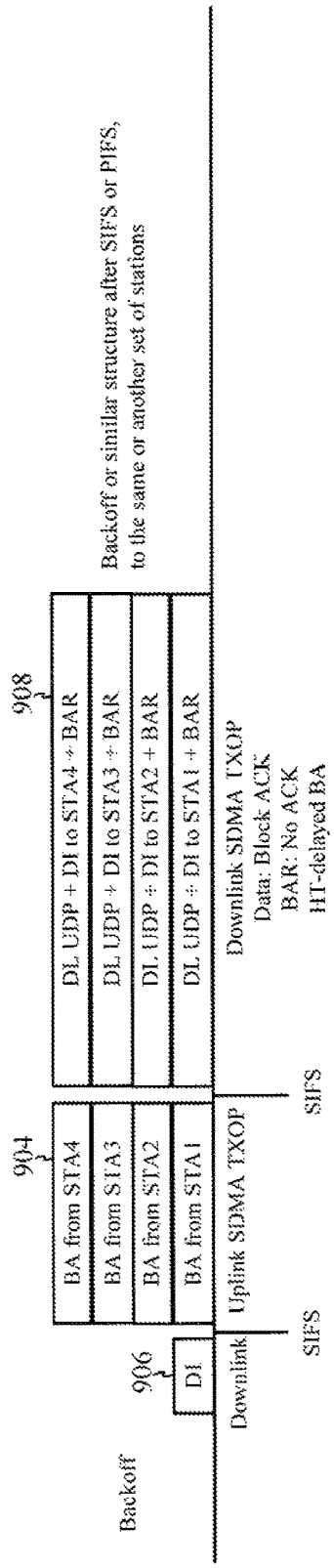

In the frame exchange illustrated in FIG. 9, after a backoff, the AP may broadcast a DI frame 906 indicating the timing and the resource allocation of a pending uplink SDMA TXOP. The broadcast DI frame 906 may be sent instead of the separate DIs sent in FIG. 8. Resources in the uplink SDMA TXOP may be allocated to stations 1-4. During the uplink SDMA TXOP, stations 1-4 may transmit a BA frame 904 to the AP. The BAs may acknowledge previously received UDP frames from the AP as requested by a prior BAR.

After the uplink SDMA TXOP, the AP may start a downlink SDMA TXOP. During the downlink SDMA TXOP, the AP may transmit an A-MPDU to stations 1-4 in parallel. The downlink A-MPDUs may contain one or more UDP frames and a BAR frame. The one or more UDP frames may contain video data. The BAR frame may request acknowledgement of received UDP frames. HT-delayed BA may be used for the downlink UDP streams (e.g., after a subsequent broadcast DI frame). As illustrated, the one or more UDP frames may indicate the Block ACK policy, to avoid eliciting a SIFS response by the receiving stations. The BAR frame may indicate the No ACK policy for this frame, for the same reason.

Figure 10:
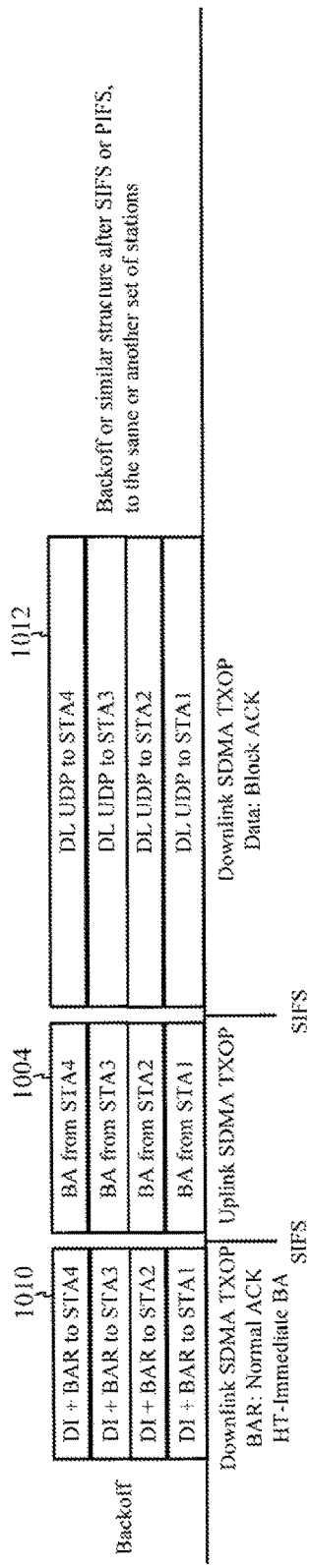

According to the exchange in FIG. 10, the AP may start a downlink SDMA TXOP, during which the AP transmits an A-MPDU 1010 to stations 1-4. The A-MPDU 1010 may contain a DI and a BAR. The BAR may request that a BA be transmitted by the stations as an SIFS response after the pending downlink SDMA TXOP. The BAR may specify the Normal ACK policy. During the uplink SDMA TXOP, the stations may send the requested BAs 1004 to the AP. The BAs 1004 may acknowledge prior data received from the AP. After the uplink SDMA TXOP, the AP may start a second downlink SDMA TXOP. During the second downlink SDMA TXOP, the AP may send an A-MPDU 1012 with downlink UDP frames to stations 1-4 with Block ACK policy.

While the DI and BAR in the first downlink SDMA TXOP may be aggregated as A-MPDUs, as shown in FIG. 10, according to certain aspects, a new DI+BAR frame may also be designed for this purpose.

Figure 11:
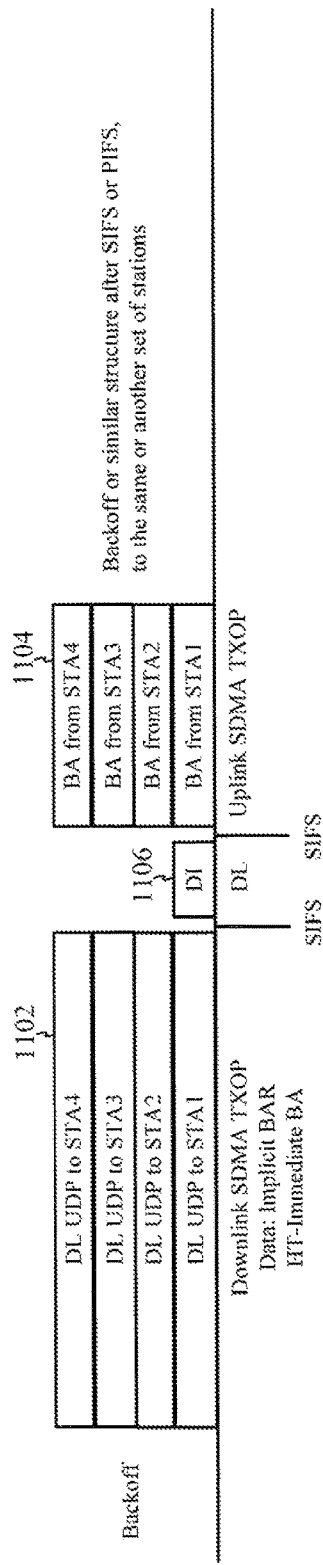

In the example exchange illustrated in FIG. 11, UDP frames transmitted via A-MPDUs 1102, may indicate the Implicit BAR policy. The type of Block ACK used for transmitting the UDP frames in the downlink direction may be modified HT-immediate ACK, with the modification that the BA response is transmitted a SIFS period after a DI. Accordingly, the BA responses 1104 may be transmitted after the DI 1106, during the uplink SDMA TXOP indicated by the DI 1106.

According to certain aspects, a delayed BA may be used in place of an immediate BA. In this case, the ACK policy on the UDP frames may be set to Block ACK and a BAR indicating No ACK may be aggregated to the downlink A-MPDUs.

Figure 12:
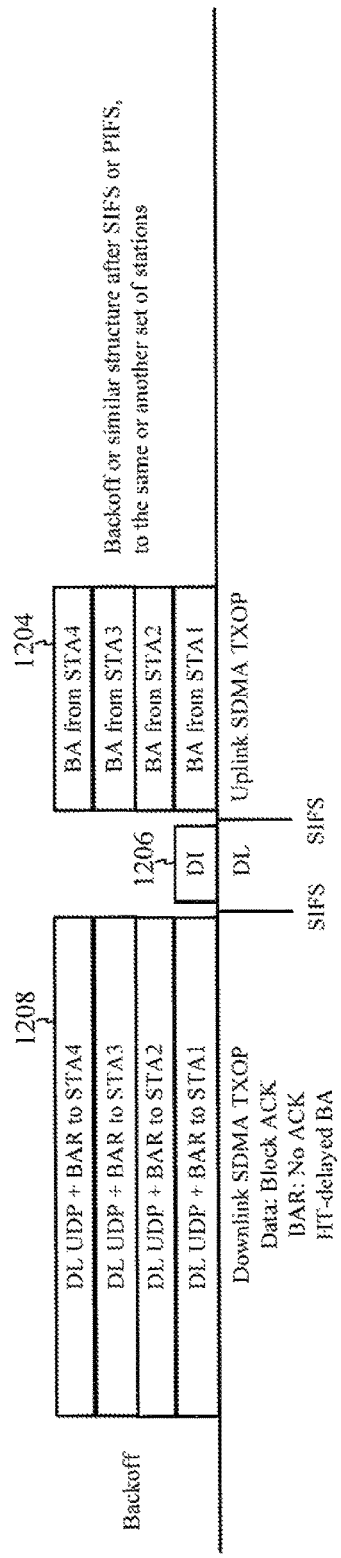

FIG. 12 illustrates a frame exchange sequence in which the BAR in A-MPDUs 1208 may specify the No ACK policy and the Data in A-MPDUs 1208 may specify the Block ACK policy. This is similar to the example exchange of FIG. 11, but for the inclusion of the BAR in the MPDUs and the use of HT-delayed BA instead of HT-immediate BA. The BA response 1204, from the stations may be sent after receiving the DI frame 1206.

Figure 13:
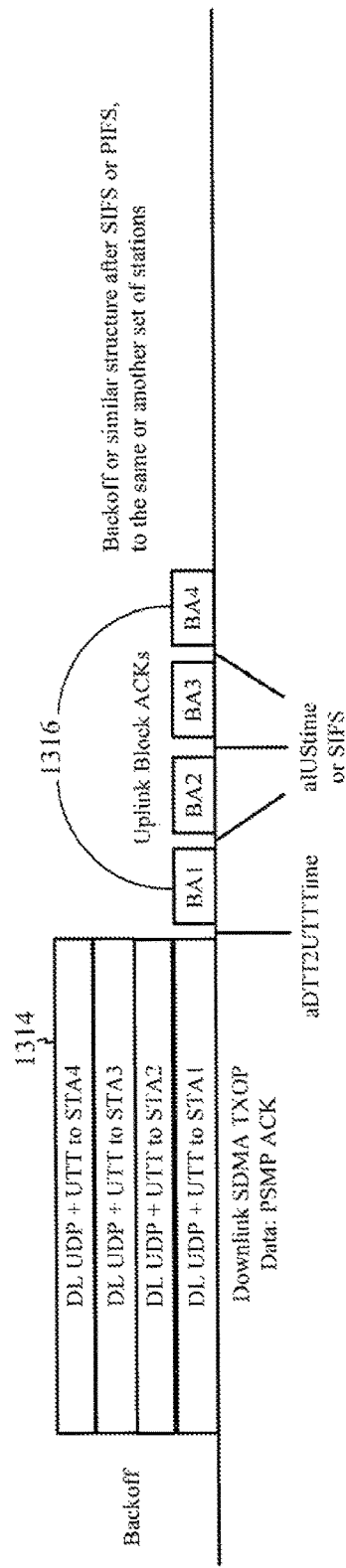

FIG. 13 illustrates an example frame exchange in which uplink transmission may be based on an Uplink Transmission Time (UTT) sent by the AP. The UTT may be transmitted via an A-MPDU 1314. The UTT may specify the start time and duration of a sequential uplink TXOP for each station.

The one or more UDP frames 1314 may specify the Power Save Multi-Poll (PSMP) ACK policy. HT-immediate BA may be used for the downlink UDP streams. The UTT may be an Action No ACK frame, so that no SIFS response will be elicited. The scheduled uplink TXOPs may contain the requested uplink BA frames 1316 or Multi-Traffic Identifier BAs (MTBAs), as desired.

According to certain aspects, SDMA may not be used in the uplink direction, because the uplink responses are scheduled sequentially. This approach may be used, for example, when the stations are not capable of SDMA transmissions (non-SDMA stations).

The first uplink transmission may start some period after the downlink transmission. In practice, this interval may be SIFS (e.g., 16 us). The interval between uplink transmissions may be equal to aIUStime or SIFS. When Reduced Interface Space (RIFS) is supported, this interval may shorter (e.g., 8 us).

Figure 14:
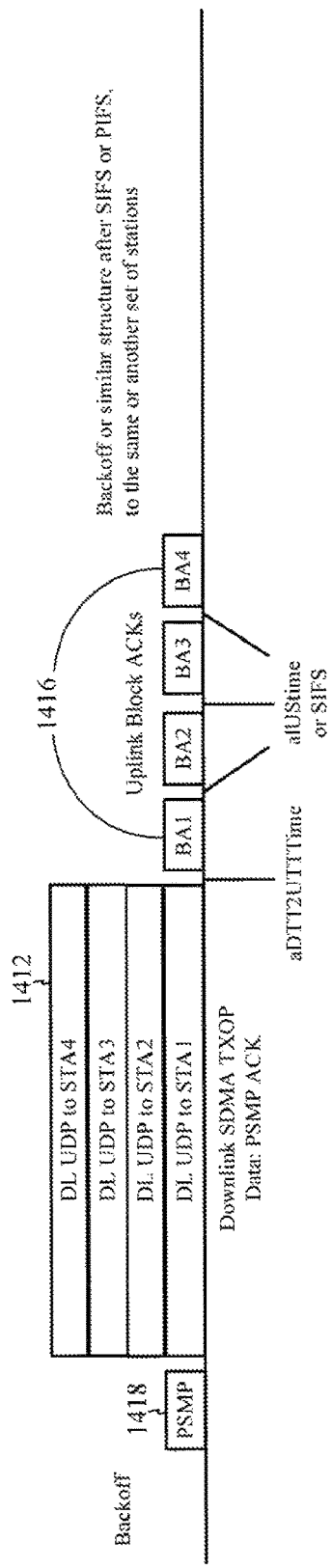

According to the frame exchange illustrated in FIG. 14, the AP may send a PSMP frame 1418 specifying a downlink SDMA TXOP and a series of sequential uplink TXOPs. The AP may then start the scheduled downlink SDMA TXOP during which an A-MPDU 1412 may be transmitted to STA 1-4 in parallel. The one or more UDP frames composing the A-MPDU 1412 may specify the PSMP ACK policy. HT-immediate BA may be used for the downlink UDP streams. The sequential uplink TXOPs may contain the uplink BA frames 1416 from STA 1-4. According to certain aspects, an MTBA frame may be transmitted instead of a BA frame.

The PSMP 1418 frame may set a Network Allocation Vector (NAV) to protect the pending downlink SDMA TXOP and the uplink TXOPs. The PSMP frame 1418 may indicate which stations will be receiving data during the downlink SDMA TXOP. Stations not included in the PSMP frame may enter a sleep mode for the duration of the PSMP sequence, or until the scheduled occurrence of a subsequent PSMP frame.

According to certain aspects, the PSMP frame 1418 may be a modified version of the existing PSMP frame, wherein the modification allows downlink transmission times to overlap. RIFS may be used between the PSMP frame 1418 and the start of the downlink SDMA TXOP.

Figure 7A:
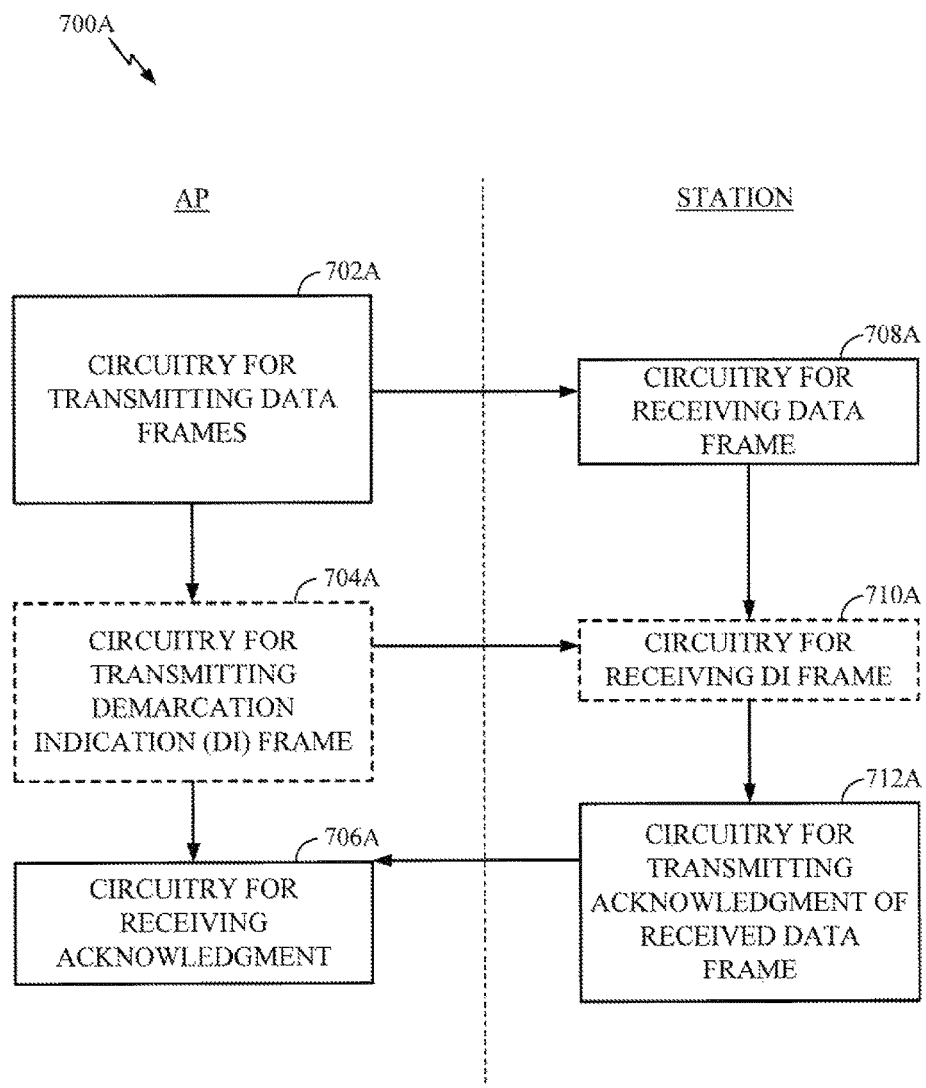
FIG. 7A illustrates example circuitry capable of performing the operations illustrated in FIG. 7.

The various operations of the method described above may be performed by various hardware and/or software component(s) and/or module(s) corresponding to means-plus-function blocks illustrated in the Figures. Generally, where there are methods illustrated in Figures having corresponding counterpart means-plus-function Figures, the operation blocks correspond to means-plus-function blocks with similar numbering. For example, operations 702-712 illustrated in FIG. 7 corresponds to blocks 702A-712A illustrated in FIG. 7A.

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

The steps of a method or algorithm described in connection with the present disclosure may be embodied directly in hardware, in a software module executed by a processor or in a combination of the two. A software module may reside in any form of storage medium that is known in the art. Some examples of storage media that may be used include RAM memory, flash memory, ROM memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein, such as those illustrated in the Figures, can be downloaded and/or otherwise obtained by a mobile device and/or base station as applicable. For example, such a device can be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a mobile device and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims While the foregoing is directed to aspects of the present disclosure, other and further aspects of the disclosure may be devised without departing from the basic scope thereof, and the scope thereof is determined by the claims that follow.

The invention claimed is:

1. A method for transmitting data to multiple wireless apparatuses, comprising:
   transmitting, to the wireless apparatuses, a first transmission comprising data frames for each wireless apparatus during a first transmit opportunity, wherein the first transmission indicates an acknowledgement (ACK) policy, wherein the ACK policy indicates a type of acknowledgement of the data frames to be received from the wireless apparatuses;
   transmitting, to the wireless apparatuses, a second transmission comprising a frame indicating one or more frequency resource allocations for one or more second transmit opportunities, wherein the second transmission is during a third transmit opportunity that is after the first transmit opportunity; and
   receiving, during the one or more second transmit opportunities, acknowledgements of receipt of the data frames from the wireless apparatuses in response to the frame indicating the one or more frequency resource allocations.

2. The method of claim 1, wherein the frame indicating the one or more frequency resources allocations further indicates a start of the second transmit opportunities.

3. The method of claim 1, wherein the frame indicating the one or more frequency resource allocations further comprises a block acknowledgement request (BAR), and wherein receiving the acknowledgements of receipt of the data frames is in response to the BAR.

4. The method of claim 1, wherein the first transmission is transmitted via a spatial division multiple access (SDMA) scheme.

5. The method of claim 1, wherein receiving the acknowledgements of receipt of the data frames comprises receiving multiple acknowledgements simultaneously via a spatial division multiple access (SDMA) scheme.

6. The method of claim 1, wherein the data frames comprise streaming video data.

7. A method of wireless communications, comprising:
   receiving a first transmission comprising a data frame during a first transmit opportunity in which multiple data frames were sent to multiple wireless apparatuses, wherein the first transmission indicates an acknowledgement (ACK) policy, wherein the ACK policy indicates a type of acknowledgement of the data frame;
   receiving a second transmission comprising a frame indicating a frequency resource allocation for a second transmit opportunity, wherein the second transmission is during a third transmit opportunity that is after the first transmit opportunity; and
   transmitting an acknowledgement of receipt of the data frame during the second transmit opportunity based on the frequency resource allocation and in response to the frame indicating the frequency resource allocation, wherein the transmitting of the acknowledgement of receipt of the data frame is further based on the ACK policy.

8. The method of claim 7, wherein the frame indicating the frequency resource allocation further indicates a start of the second transmit opportunity.

9. The method of claim 7, wherein the frame indicating the frequency resource allocation further comprises a block acknowledgement request (BAR), and wherein transmitting the acknowledgement of receipt of the data frame is in response to the BAR.

10. The method of claim 7, wherein the data frames were sent simultaneously to the wireless apparatuses via a spatial division multiple access (SDMA) scheme.

11. The method of claim 7, wherein transmitting the acknowledgement of the received data frame during the second transmit opportunity comprises transmitting the acknowledgement simultaneously with acknowledgements transmitted by other wireless apparatuses.

12. The method of claim 7, wherein the data frame comprises streaming video data.

13. An apparatus for transmitting data to multiple wireless apparatuses, comprising:
   a transmitter for:
      transmitting, to the wireless apparatuses, a first transmission comprising data frames during a first transmit opportunity, wherein the first transmission indicates an acknowledgement (ACK) policy, wherein the ACK policy indicates a type of acknowledgement of the data frames to be received from the wireless apparatuses; and
      transmitting, to the wireless apparatuses, a second transmission comprising a frame indicating one or more frequency resource allocations for one or more second transmit opportunities, wherein the second transmission is during a third transmit opportunity that is after the first transmit opportunity; and
   a receiver for receiving, during the one or more second transmit opportunities, acknowledgements of receipt of the data frames from the wireless apparatuses in response to the frame indicating the one or more frequency resource allocations.

14. The apparatus of claim 13, wherein the frame indicating one or more frequency resource allocations further indicates a start of the second transmit opportunities.

15. The apparatus of claim 13, wherein the frame indicating one or more frequency resource allocations further comprises a block acknowledgement request (BAR), and wherein receiving the acknowledgements of receipt of the data frames is in response to the BAR.

16. The apparatus of claim 13, wherein the first transmission is transmitted via a spatial division multiple access (SDMA) scheme.

17. The apparatus of claim 13, wherein the receiver is configured to receive multiple acknowledgements simultaneously via a spatial division multiple access (SDMA) scheme.

18. The apparatus of claim 13, wherein the data frames comprise streaming video data.

19. An apparatus for wireless communications, comprising:
a receiver for:
receiving a first transmission comprising a data frame during a first transmit opportunity in which multiple data frames were sent to multiple wireless apparatuses, wherein the first transmission indicates an acknowledgement (ACK) policy, wherein the ACK policy indicates a type of acknowledgement of the data frame; and
receiving a second transmission comprising a frame indicating a frequency resource allocation for a second transmit opportunity, wherein the second transmission is during a third transmit opportunity that is after the first transmit opportunity; and
a transmitter for transmitting an acknowledgement of receipt of the data frame during the second transmit opportunity based on the frequency resource allocation and in response to the frame indicating the frequency resource allocation, wherein the transmitting the acknowledgement of receipt of the data frame is further based on the ACK policy.

20. The apparatus of claim 19, wherein the frame indicating the frequency resource allocation further indicates a start of the second transmit opportunity.

21. The apparatus of claim 19, wherein the frame indicating the frequency resource allocation further comprises a block acknowledgement request (BAR), and wherein transmitting the acknowledgement of receipt of the data frame is in response to the BAR.

22. The apparatus of claim 19, wherein the data frames were sent simultaneously to the wireless apparatuses via a spatial division multiple access (SDMA) scheme.

23. The apparatus of claim 19, wherein the transmitter is configured to transmit the acknowledgement simultaneously with acknowledgements transmitted by other wireless apparatuses.

24. The apparatus of claim 19, wherein the data frame comprises streaming video data.

25. An apparatus for transmitting data to multiple wireless apparatuses, comprising:
means for transmitting, to the wireless apparatuses, a first transmission comprising data frames during a first transmit opportunity, wherein the first transmission indicates an acknowledgement (ACK) policy, wherein the ACK policy indicates a type of acknowledgement of the data frames to be received from the wireless apparatuses;
means for transmitting, to the wireless apparatuses, a second transmission comprising a frame indicating one or more frequency resource allocations for one or more second transmit opportunities, wherein the second transmission is during a third transmit opportunity that is after the first transmit opportunity; and
means for receiving, during the one or more second transmit opportunities, acknowledgements of receipt of the data frames from the wireless apparatuses in response to the frame indicating the one or more frequency resource allocations.

26. The apparatus of claim 25, wherein the frame indicating one or more frequency resources allocations further indicates a start of the second transmit opportunities.

27. The apparatus of claim 25, wherein the frame indicating one or more frequency resource allocations further comprises a block acknowledgement request (BAR), and wherein means for receiving the acknowledgements of receipt of the data frames is in response to the BAR.

28. The apparatus of claim 25, wherein the first transmission is transmitted via a spatial division multiple access (SDMA) scheme.

29. The apparatus of claim 25, wherein the means for receiving is configured to receive multiple acknowledgements simultaneously via a spatial division multiple access (SDMA) scheme.

30. The apparatus of claim 25, wherein the data frames comprise streaming video data.

31. An apparatus for wireless communications, comprising:
means for receiving a first transmission comprising a data frame during a first transmit opportunity in which multiple data frames were sent to multiple wireless apparatuses, wherein the first transmission indicates an acknowledgement (ACK) policy, wherein the ACK policy indicates a type of acknowledgement of the data frame;
means for receiving a second transmission comprising a frame indicating a frequency resources allocation for a second transmit opportunity, wherein the second transmission is during a third transmit opportunity that is after the first transmit opportunity; and
means for transmitting an acknowledgement of the received data frame during the second transmit opportunity based on the frequency resource allocation and in response to the frame indicating the frequency resource allocation, wherein the means for transmitting the acknowledgement of receipt of the data frame is further based on the ACK policy.

32. The apparatus of claim 31, wherein the frame indicating the frequency resource allocation further indicates a start of the second transmit opportunity.

33. The apparatus of claim 31, wherein the frame indicating the frequency resource allocation further comprises a block acknowledgement request (BAR), and wherein means for transmitting the acknowledgement of receipt of the data frame is in response to the BAR.

34. The apparatus of claim 31, wherein the data frames were sent simultaneously to the wireless apparatuses via a spatial division multiple access (SDMA) scheme.

35. The apparatus of claim 31, wherein the means for transmitting the acknowledgement of the received data frame is configured to transmit the acknowledgement simultaneously with acknowledgements transmitted by other wireless apparatuses.

36. The apparatus of claim 31, wherein the data frame comprises streaming video data.

37. A non-transitory computer readable medium comprising instructions executable to:
transmit, to multiple wireless apparatuses, a first transmission comprising data frames during a first transmit opportunity, wherein the first transmission indicates an acknowledgement (ACK) policy, wherein the ACK policy indicates a type of acknowledgement of the data frames to be received from the wireless apparatuses;
transmitting, to the wireless apparatuses, a second transmission comprising a frame indicating one or more frequency resource allocations for one or more second transmit opportunities, wherein the second transmission is during a third transmit opportunity that is after the first transmit opportunity; and
receive, during the one or more second transmit opportunities, acknowledgements of the data frames from the wireless apparatuses in response to the frame indicating the one or more frequency resource allocations.

38. A non-transitory computer readable medium comprising instructions executable to:
receive a first transmission comprising a data frame during a first transmit opportunity in which multiple data frames were sent to multiple wireless apparatuses, wherein the first transmission indicates an acknowledgement (ACK) policy, wherein the ACK policy indicates a type of acknowledgement of the data frame;
receiving a second transmission comprising a frame indicating a frequency resource allocation for a second transmit opportunity, wherein the second transmission is during a third transmit opportunity that is after the first transmit opportunity; and
transmit an acknowledgement of the received data frame during the second transmit opportunity based on the frequency resource allocation and in response to the frame indicating the frequency resource allocation, wherein the transmitting the acknowledgement of receipt of the data frame is further based on the ACK policy.

39. A wireless access point, comprising:
at least one antenna;
a transmitter for:
transmitting via the antenna, to multiple wireless apparatuses, a first transmission comprising data frames during a first transmit opportunity, wherein the first transmission indicates an acknowledgement (ACK) policy, wherein the ACK policy indicates a type of acknowledgement of the data frames to be received from the wireless apparatuses; and
transmitting, to the wireless apparatuses, a second transmission comprising a frame indicating one or more frequency resource allocations for one or more second transmit opportunities, wherein the second transmission is during a third transmit opportunity that is after the first transmit opportunity; and
a receiver for receiving via the antenna, during the one or more second transmit opportunities, acknowledgements of receipt of the data frames from the wireless apparatuses in response to the frame indicating the one or more frequency resource allocations.

40. A wireless station, comprising:
at least one antenna;
a receiver for:
receiving via the antenna a first transmission comprising a data frame during a first transmit opportunity in which multiple data frames were sent to multiple wireless apparatuses, wherein the first transmission indicates an acknowledgement (ACK) policy, wherein the ACK policy indicates a type of acknowledgement of the data frame; and
receiving a second transmission comprising a frame indicating a frequency resource allocation for a second transmit opportunity, wherein the second transmission is during a third transmit opportunity that is after the first transmit opportunity; and
a transmitter for transmitting via the antenna an acknowledgement of receipt of the data frame during the second transmit opportunity based on the frequency resource allocation and in response to the frame indicating the frequency resource allocations, wherein the transmitting the acknowledgement of receipt of the data frame is further based on the ACK policy.

* * * * *